United States Patent Office 3,107,173
Patented Oct. 15, 1963

3,107,173
MICA PIGMENT
Edward F. Klenke, Jr., Summit, N.J., assignor to E. I. du Pont de Nemours and Company, Wilmington, Del., a corporation of Delaware
No Drawing. Filed June 28, 1961, Ser. No. 120,156
10 Claims. (Cl. 106—291)

This invention relates to flake pigments in the gray-to-black color range.

In the past, many types of flake materials have been proposed for use as pigments. Such materials include fish scales, mica, glass flakes, and various metal powders, including aluminum powder which is probably the most widely used flake pigment presently available. In the gray-to-black color range, the prior art proposes the use of graphite as a flake pigment. However, this material has not received wide acceptance for this purpose. A more commonly used composition for producing a flake pigment effect in the gray-to-black color range consists of aluminum powder admixed with small amounts of carbon black. Such mixtures are durable pigments, and they can be used in conventional coating compositions to produce light-gray, lustrous finishes exhibiting a pleasing, decorative appearance frequently referred to as a "metal-lizing" effect. However, there are also certain disadvantages inherent in the use of admixtures of aluminum powder and carbon black. It is well known that finishes containing aluminum powder have a tendency to water-spot. For example, if finishes containing aluminum are subjected to prolonged contact with water which is on the alkaline side (e.g., water made alkaline by the use of a detergent), discoloration of the contacted area often results. Moreover, experience has shown that the variety of shades obtainable with the use of aluminum powder and carbon black as a pigment is somewhat limited. When attempts have been made to produce black metallized finishes by increasing the proportion of carbon black in the coating composition, a dull brown color rather than black has been obtained.

The present invention is concerned with a new and improved series of flake pigments which provides a wide choice of shades in the gray-to-black color ranges. These new pigments make possible the formulation of lustrous, metallized-appearing finishes having gray-to-black backgrounds in conjunction with a silvery sparkle. In bright sunlight, the silvery sparkle takes on the appearance of an iridescent sparkle where many of the colors of the rainbow are seen on the gray-to-black backgrounds. In addition to the unusual decorative effects that can be obtained by using these pigments, it has been found that such pigments are resistant to water-spotting. Also, they exhibit remarkable light-fastness on both indoor and outdoor exposure.

The pigment compositions of this invention are comprised of a translucent micaceous flake substrate, such as muscovite mica, coated with a thin, adherent, substantially continuous, translucent layer of carbon. The carbon layer may be formed on the flake substrates by pyrolyzing a carbon-containing material in contact with the flake substrate, in an inert atmosphere. For example, the flake substrates can be wet with a liquid hydrocarbon and then subjected to pyrolyzing temperatures in the absence of air.

In a preferred embodiment of the invention, the flake substrate is a flake-like micaceous mineral, usually muscovite mica, in a selected particle size range. A satisfactory grade is a water-ground white mica, frequently used as a reinforcing extender pigment in paint, all of which passes through a 200 mesh screen and about 90% through a 325 mesh screen, and which has a specific surface area in the order of three square meters per gram as determined by gas adsorption in the well-known B.E.T. method described by Emmet in "Advances in Colloid Science," vol. 1, New York, Interscience Publishers, Inc., 1942, pp. 1-35. The thin film of carbon is deposited on the mica by wetting the mica with a liquid hydrocarbon and then pyrolyzing the hydrocarbon on the mica in the absence of oxygen (preferably in a nitrogen atmosphere) at a temperature in the range of 900-1000° C. The amount of carbon deposited can be varied, for instance, by varying the time and temperature of pyrolysis, by varying the mica/hydrocarbon ratio in the starting mixture, by variations in the partial vapor pressure of the hydrocarbon in the atmosphere through direct addition of the vapor to the vessel while heating, or by cooling the charge and repeating the operation.

The unusual decorative effects obtained with the pigment of this invention are due to a combination of properties some of which are provided by the substrate, and others of which are provided by the carbon layer. The carbon layer is a substantially continuous layer. This fact has been established by dissolving away the micaceous substrate with hydrofluoric acid and examining the remaining film in an electron microscope, whereupon no obvious discontinuities in the film can be discerned. Moreover, this carbon layer and also the substrate must be translucent or non-opaque; i.e., they must admit the passage of light. The unusual iridescence obtained with the pigments of this invention is dependent upon the destructive interference of some of the wave lengths of the light which is being reflected from the top and bottom surfaces of the mica and from the surfaces of layers within the mica flake itself. Examination of the carbon coatings by electron diffraction techniques shows that very diffuse patterns are obtained, typical of the form of so-called "amorphous" carbon known to result from the decomposition of hydrocarbons on surfaces at high temperatures. See "Ephraim's Inorganic Chemistry," Thorn and Roberts, 6th edition, New York, Interscience, 1954, pp. 150-168. The shade of the pigment will, of course, be affected by its carbon content. However, an increase in the carbon content does not necessarily mean that a darker pigment will be produced. As will be seen from the specific examples which appear hereinafter, in the lower ranges of carbon content the darkness of the pigment increases with increasing carbon content. However, as the carbon is increased in this lower range, a maximum point of darkness is reached, and as the carbon content is gradually increased beyond this point, it will be noted that the pigment becomes sharply lighter and then gradually shades off to a pronounced gray.

With respect to the substrate, it has been mentioned above that it must be capable of permitting the passage of light. In addition to this property, the substrate must be in the form of a flake in order to obtain the decorative properties associated with the pigments of the invention. Micaceous materials in flake form possess the necessary translucency to serve as the substrate for the new pigment. It has been pointed out that muscovite, often referred to as white mica or simply mica, is a preferred material. However, other non-opaque mineral flakes which can be used include other forms of mica such as biotite, phlogopite, and the related micaceous mineral, vermiculite. Synthetic micas may also be used in this invention. The carbon coating on the realtively smooth surface of the translucent flake substrate appears to play the principal role in determining the appearance of the final product. Nevertheless, since the carbon film is itself translucent, any color in the substrate may influence the color of the final product to some extent. Thus, biotite, often called black mica, becomes a yellowish powder in finely divided flake form, and carbon-coated biotite produces coating compositions with a dark golden cast exhibiting pronounced iridescent sparkle. Many samples of vermiculite are also yellowish, and they produce gray carbon-coated flakes with a yellowish tinge.

One skilled in the art will, of course, recognize that the decorative properties of the pigments do not become fully apparent until they are put to their ultimate use. Therefore, when decorative properties are discussed herein, reference is being made to the appearance of the pigment in an environment where the pigment would normally be employed. The following formulations are illustrative of such environments, and they are also used in the ensuing portion of the specification as a means for evaluating the decorative properties of the pigments. In these formulations, parts and percentages are on a weight basis.

FORMULATION A—BAKED ACRYLIC LACQUER

| | Parts |
|---|---|
| Pigment of this invention | 2.6 |
| Mixed acrylic ester polymer ("Acryloid" A–101) | 17.9 |
| Butyl benzyl phthalate | 7.7 |
| Monoacetate of ethylene glycol monoethyl ether | 20.0 |
| Methyl ethyl ketone | 56.9 |
| Toluene | 50.0 |

The pigment is stirred for about 15 minutes in a mixture of the acrylic polymer, the butyl benzyl phthalate, and enough solvent to render the mass stirrable. The remainder of the solvents is then added, and the mixing is continued until a uniform composition is obtained. Exhibits can be prepared by spraying onto primed panels and, after drying, baking at 80–85° C. for 20 minutes. In addition to being a means for evaluating the new pigments, this formulation, as well as Formulation B, produces high-quality coating compositions. Also, such formulations can be subjected to conventional modifications known in the art.

FORMULATION B—BAKED ALKYD ENAMEL

| | Parts |
|---|---|
| Pigment of this invention | 2.5 |
| Non-oxidizing, coconut oil-modified alkyd resin solution (60% solids) | 29.2 |
| Butylated melamine formaldehyde resin (55% solids) | 13.6 |
| Aromatic hydrocarbon solvent | 15.0 |
| Aliphatic hydrocarbon solvent | 19.0 |

The pigment is added to the mixed resin solutions with a part of the solvent and dispersed by high-speed stirring for about 15 minutes, after which the remainder of the solvent is stirred in. Exhibits can be prepared by spraying the enamel onto a primed metal panel which is then baked for one half hour at about 120° C.

In addition to the above formulation, the following procedures are also referred to herein as a means of evaluating the pigments. All parts and precentages given in these procedures are on a weight basis.

*Procedure A*

0.200 part of the new pigment is mixed with 0.650 part of an acrylic lacquer consisting of a clear solution containing:

| | Percent |
|---|---|
| Mixed acrylic ester polymer ("Acryloid" A–101) | 25.7 |
| Butyl benzyl phthalate | 10.6 |
| Monoacetate of ethylene glycol monoethyl ether | 5.0 |
| Methyl ethyl ketone | 46.1 |
| Toluene | 12.6 |

The pigment and lacquer are mixed with a spatula until completely wet and spread on a glass microscope slide between strips of masking tape which serve to confine the mixture and to serve as shims for drawing down with a straight edge to a wet film thickness of 0.3 mm. The lacquer is allowed to dry, and the resulting film is observed through the glass. It is also pointed out that the pigmented formulation of this procedure with the addition of more thinner produces an excellent coating composition.

*Procedure B*

1.0 part of the new pigment is added to 20 parts of a cellulose acetate solution containing 16.7% cellulose acetate in acetone. The mixture is stirred until thoroughly mixed. A glass plate is prepared for stripping a film therefrom by coating the clear plate with a silicone stopcock grease and then wiping thoroughly with a dry cloth. The lacquer is spread on the glass plate and drawn down to a wet film thickness of about 0.16 mm. After the solvent has evaporated, the film is stripped from the plate and observed on the smooth side. Such films may be used as a quick test for overall appearance and for observing the color of the films under transmitted light. Also, they are especially useful for lightfastness tests in accelerated methods such as in the "Fade-Ometer." Such films are in the gray-to-black color range, and they have the nacreous luster which is characteristic of the pigment of this invention, but they are frequently lacking in the iridescent sparkle so characteristic of the same pigments in enamel or lacquer films.

A visual examination of products made in accordance with the above formulations brings out the fact that the usual appearances imparted by the pigment of this invention can be described in a number of ways. It has been previously pointed out that the pigments are capable of producing finishes which, depending upon the intensity of the light shining on such finishes, exhibit an iridescent sparkle or a silvery sparkle on a background which is in the gray-to-black color range. In addition to sparkle, the pigments also exhibit a pleasing decorative effect referred to as a "nacreous" appearance—so called because of a luster or reflection in depth which is suggestive of pearl. Nacreous pigments are known. However, the new products of this invention are the first pigments in the gray-to-black color range which are capable of producing this nacreous effect.

For a clearer understanding of the invention, the following specific examples are given. These examples are intended to be merely illustrative of the invention and not in limitation thereof. Unless otherwise specified, all parts are by weight, and all mesh sizes are based upon the U.S. standard screen scale.

EXAMPLE I

The substrate used in this example is a water-ground white mica (muscovite) sold under the name "Concord Wet Ground Mica #200/325." This mica has a specific surface area of about 3 square meters per gram, as determined by krypton adsorption in the previously mentioned B.E.T. method. All of the mica passed through a 200 mesh screen and about 90% passed through a 325 mesh screen. The average particle size is in the range of 20–40 microns in maximum dimension. 100 parts of this mica and 130 parts of mineral spirits (a purified aliphatic hydrocarbon cut with a boiling range of about 160–200° C.) are thoroughly mixed into a paste and spread in a layer about ½ inch deep in a porcelain boat. The loaded boat is then placed in a silica tube of suitable dimensions which is closed at one end and which has a means at the open end for creating a vacuum in the tube. The tube is mounted in a suitable furnace so that the boat is completely enclosed in the heating zone. To remove all oxygen from the tube and replace it with an inert gas, the tube is evacuated (about 50 mm. Hg pressure) and nitrogen gas is introduced to release the vacuum, this sequence being repeated three times. Under a slight positive pressure of nitrogen, the charge is heated over a period of about one hour to 950–1000° C. and held at that temperature for about 30 minutes to pyrolyze the hydrocarbon. After cooling to room temperature, the tube is opened and the product recovered from the boat.

It consists of very finely divided shiny black flakes which comprise the original colorless mica flakes on which has been deposited a thin film of carbon (about 3% carbon based on the sample wt.). This product may be dispersed in a conventional coating composition with substantially no work being done in the system beyond the stirring necessary to give a uniform mixture.

When dispersed in an acrylic lacquer such as Formulation A, the resulting dry panels exhibit an overall very-dark-gray nacreous appearance, and a wholly unexpected brilliant iridescent sparkle of many colors when viewed under bright illumination.

EXAMPLE II

In order to deposit a thicker layer of carbon on the mica and to study its effect on color, the procedure of Example I was followed, and the product obtained was again mixed with the same amount of mineral spirits and subjected to a second pyrolysis step in the manner described in Example I. The mica and the hydrocarbon used were the same as in the previous example. When compared in an acrylic lacquer finish such as one prepared from Formulation A, the product of the second pyrolysis step is unexpectedly lighter than the product from the first pyrolysis. However, the product of the second pyrolysis showed enhanced iridescent sparkle. When the procedure of Example I is repeated a third time and the product compared in the lacquer finish, the product of this third pyrolysis is still lighter than the product from the second pyrolysis, and it exhibits a greater degree of iridescence. The sequence of steps described in Example I was conducted until the mica was subjected to 13 separate pyrolysis steps. The following table gives the carbon content and color of the product after each pyrolysis. Color comparisons were made in a lacquer finish based on Procedure A.

*Table 1*

| Product of pyrolysis step | Percent carbon based on total pigment weight | Color |
| --- | --- | --- |
| Number 1 | 3.13 | Very dark gray (almost black). |
| Number 2 | 6.07 | Progressively lighter. |
| Number 3 | 9.2 | |
| Number 4 | 11.9 | Light gray. |
| Number 5 | 15.2 | About equal to No. 4. |
| Number 6 | 19.8 | |
| Number 7 | 24.3 | |
| Number 8 | 31.9 | Progressively darker and less intense. |
| Number 10 | 35.0 | |
| Number 13 | 48.0 | |

Within the range of carbon content shown in this example, the products change from a very dark gray at 3% carbon to a much lighter gray at about 12–15% carbon. As the carbon is increased beyond this point, there is a tendency to become darker again. Also, in the lower ranges of carbon content, the brilliance of the iridescence in sunlight increases up to about 12–15% carbon and then falls off gradually up to about 50% carbon content. Likewise, the nacreous character decreases with carbon content in the range above about 15% and ceases to be significant above about 50% carbon.

EXAMPLE III

As another means of obtaining a thicker layer of carbon, the basic process described in Example I is modified by adding mineral spirits slowly to the heating zone during the heat-up period so as to maintain a saturated atmosphere of mineral spirits vapor at all times. More specifically, the apparatus of Example 1 is modified (1) so that a stream of nitrogen can be passed through the tube continuously, and (2) the tube is slightly inclined downward in the direction of nitrogen flow and a second inlet in the upper end is attached to a dropping funnel containing mineral spirits. The charge of 100 parts water-ground white mica, as in Example I, mixed with 130 parts of mineral spirits, is placed in the tube in a porcelain boat and the atmosphere is replaced by nitrogen by prolonged flow through the tube. The charge is then heated to about 1000° C. in about 40 minutes, and during this time, a total of 40 parts mineral spirits is added dropwise through the inlet tube so that it runs slowly down into the heating zone. The charge is then held at 1000° C. for about 30 minutes without further addition of mineral spirits. Upon cooling the charge and removing it from the apparatus, there is obtained a sparkling gray powder containing about 13% carbon. When exhibit panels prepared from this powder using Formulation B are viewed in the bright sunlight, a brilliant iridescent sparkle on a gray background is seen.

EXAMPLE IV

Using the heating tube and general procedure of Example I, 100 parts of water-ground white mica, as described in Example I, is mixed with 120 parts of various carbon-containing liquids and the pastes spread in a ¼"-deep layer on a flat tray in the tube. The charges are heated to 900° C. in 40 minutes and held at 900° C. for 30 minutes. After cooling, the nacreous flake pigments are examined in an acrylic lacquer by the method of Procedure A with the results shown in the following table:

*Table 2*

| Carbon source | Percent carbon based on total pigment weight | Color |
| --- | --- | --- |
| Mineral spirits | 8.97 | Medium gray (control). |
| Mineral oil ("Nujol") | 1.54 | Slightly darker than control. |
| Fuel oil (Bunker C) | 13.20 | Slightly dark and less intense vs. control. |
| Xylene | 9.80 | Very light gray vs. control. |
| Heptane | 2.6 | Light vs. control. |
| Oleic acid | 1.0 | Less intense vs. control. |
| Carbon tetrachloride | 7.24 | Dark vs. control. |

EXAMPLE V

The process of Example I is used to coat the substrates set forth below with about 3% by weight of carbon based on total pigment weight. Color comparisons with the product of Example I are then made by Procedure A. The results are as follows:

Substrate—                                              Color vs. Example I
   Water-ground white mica of
     Example I (−200/+325
     mesh) _____ Lighter.
   Water-ground white mica of
     Example I (−160/+200
     mesh) _____ Lighter.
   Vermiculite (−200/+325
     mesh) _____ Lighter and brighter.
   Biotite mica (through 325
     mesh) _____ Similar depth but noticeably yellowish color.

EXAMPLE VI 100 parts of mica, as described in Example I, is spread in a thin layer (about ¼" deep) on a fine stainless steel screen which is placed in a suitable tube surrounded by a furnace. The atmosphere is replaced with nitrogen gas by repeated evacuation, as shown in Example I. The tube and the flakes are then heated to 900° C. Hydrocarbon vapors are then passed through the tube in different ways as follows:

(*a*) 30 parts of mineral spirits is added to the end of the hot tube so that it will vaporize and pass over the hot flakes under relatively static conditions, in the absence of any additional flow of nitrogen gas. The tube containing the hydrocarbon vapor is held for 5 minutes at 900° C. and then cooled. The product (carbon content 5.4%) comprises uniformly coated black flakes which are lighter in color than the product of Example I.

(b) In this variation, a constant stream of nitrogen gas is bubbled through a bath of mineral spirits (rapid flow, several bubbles per second) and the nitrogen, with the entrained hydrocarbon vapor, is passed through the hot tube for 5 minutes at 900° C. This product (carbon content 1.0%), after cooling, is a uniformly gray flake pigment slightly darker than the product of (a).

(c) By replacing the mineral spirits of (b) with xylene, a product is obtained with a carbon content of 1.2% which exhibits a depth of grayness intermediate between the previous two.

It is apparent that, under the conditions of (b) and (c), the carbon content can be varied at will by varying the time during which the vapor is passed over the sample.

EXAMPLE VII

The process shown in (c) above is easily adapted to a continuous process by passing the mica, in which the entrained air has been replaced with an inert gas, through a rotary calciner, heated externally and adapted for maintaining an inert atmosphere both in the calciner and in the vessel from which the mica is fed. The mica charge is maintained at a temperature of 900° C. while passing a mixture of hydrocarbon vapor, such as xylene, and the inert gas continuously through the tube at such a rate that substantially all of the hydrocarbon is pyrolyzed onto the mica flakes. This rate of gas flow may be varied, in accordance with the retention time of the mica in the heating zone and the amount of mica in the heating zone at any given time to give any desired carbon content such as about 3.0% to yield very black iridescent flakes or, if desired, reduced to about 1.0% carbon to yield light gray flakes.

The xylene in this example may be replaced by hydrocarbon gases, such as methane or propane, which may be fed into the stream of inert gas at any desired rate.

The particular particle size of the translucent micaceous substrates is not critical so long as it is such that the substrate maintains a form or shape generally classified as a flake. Micaceous flakes are, of course, well known materials, and they have been previously used as pigments. Any translucent micaceous flake suitable as a flake pigment is also suitable for this invention. For example, the American Society for Testing Materials has set forth requirements for mica pigments in A.S.T.M. specification D–607–42. Such pigments coming within this A.S.T.M. specification serve very well as a substrate. As to the configuration of the micaceous flake, it is well recognized that materials in flake form have two dimensions (length and width) of similar magnitude and a third dimension (thickness) which is very much smaller than the two larger dimensions. In micaceous materials usable as a flake pigment, the ratio of the major (maximum) dimension of the flake to the thickness is usually at least 4:1 and more often 10:1 to 100:1. Also, substantially all of the material in a lot or batch of the flake pigment is at least 10 microns in the major dimension and in the range of about 0.1 to 1.0 micron in thickness. For most pigment purposes, the upper limit in the major dimension is from 50 to 100 microns. However, for specialized uses in plastic articles of appreciable thickness, linoleum and the like, larger pigment flakes up to as much as 1 mm. in length may be used to obtain special decorative effects. The lower limit in thickness is determined to a large extent by the physical strength of the flake and may be as little as 0.01 micron, while an upper limit of about 3.0 microns is fixed by the effect on the coating composition surfaces. Such flakes must also be substantially planar with a relatively smooth and light-reflective surface and must be insoluble in either water or organic solvents and inert thereto. Also, it should be understood that thicker flakes, e.g., those of about 3 microns thickness, have correspondingly larger major dimensions so that the ratio of the major dimension to thickness is at least the previously specified 4:1.

The carbon coating applied to the flake substrate can be most readily derived from hydrocarbons. The preferred sources include hydrocarbons of relatively low volatility such as the mineral spirits and kerosene distillate fractions as well as oils of higher boiling point, such as purified mineral oils. Aromatic hydrocarbons, such as benzene, xylene, and naphthalene are also preferred materials. It is also possible to use hydrocarbon gases such as methane, propane, or natural gas. In instances where hydrocarbon vapors are the source of carbon and the mica is placed in the pyrolysis zone without first being wet with a carbon-producing material, suitable means should be used to insure uniform exposure of the flake substrate to the vapor. For instance, in Example VI uniform exposure of the substrate to the gas is accomplished by suspending a relatively thin layer of the mica on a fine wire screen support so that the gas may penetrate from all sides. An alternative procedure, preferred on a larger scale, is that of Example VII wherein the mica substrate is constantly agitated by tumbling in a rotary calciner as the hydrocarbon vapor is passed through the heating zone.

Although hydrocarbons are preferred materials as the source of the carbon, other materials may be used for this purpose. Thus, higher fatty acids, such as oleic acid, stearic acid, and the like may be used as the source of the carbon. Also, derivatives of these higher fatty acids such as their esters, including many of the natural fats and oils, are suitable. However, it should be pointed out that compounds containing oxygen in the molecule, on pyrolysis, tend to form soot or particulate carbon which is an undesirable impurity. For this reason, the oxygen in the molecule of the carbon source should be, at most, a minor part thereof. Excessive oxygen in the atmosphere of the pyrolysis zone can also cause the deposition of carbon and soot in the same manner as excessive oxygen in the molecule of the carbon source. Moreover, the presence of oxygen in this pyrolysis zone is hazardous since it increases the danger of an explosion, especially when hydrocarbons are being used as the carbon source. Oxygen can be excluded from the pyrolysis zone by the use of an inert atmosphere such as a nitrogen or argon atmosphere. This may conveniently be done by evacuating the equipment and releasing the vacuum with the inert gas or by prolonged flushing with a stream of the gas.

The temperature of pyrolysis by which carbon is deposited on the flake substrate may vary over a considerable range, e.g., temperatures in the range of about 700° C. to about 1200° C. have been used. Temperatures significantly below 700° C. have given poor deposits of carbon which tend to be dull and very brown in color and are not useful in this invention. Moreover, at temperatures in the lower end of the useful range, the deposition of carbon is slow, and although suitable pigments can be produced at such temperatures, they are likely to have a brownish cast. As temperatures are increased, the brownish cast disappears. Experience has shown that temperatures in the range of about 900° C.–1000° C. are preferred for best results. As the temperature is increased above about 1000° C., no special advantages are found and there is some evidence that less carbon is deposited.

Longer retention times in the pyrolysis zone in the presence of a hydrocarbon or some other carbon-containing pyrolyzable material usually result in the deposition of more carbon. It should also be pointed out that there is an interdependence between the time of heating and the temperature, in that higher temperatures generally promote the deposition of more carbon in any given time. Thus, an exposure of as short a time as one minute at 950° C.–1000° C. has given products having the desired characteristics in the lower range of carbon contents, while heating periods extending over an hour or more at a similar temperature, as well as at lower temperatures within the specified range, have been used with equal success.

When a liquid hydrocarbon is used to prepare the pigments of this invention, it is preferred to use a weight of hydrocarbon which somewhat exceeds the weight of the mica. However, experience has shown that the mica/hydrocarbon ratio can be varied over a wide range. For example, several experiments have been conducted wherein the mica/hydrocarbon ratio was varied within the range of 2:1 to 1:2 with the production of a suitable pigment. These experiments have also shown that as the amount of hydrocarbon is increased, the amount of carbon deposited also increases. One skilled in the art will realize that the three variables just discussed, that is, time, temperature, and mica/hydrocarbon ratio, are interdependent and that all possible combinations have not been discussed. However, the examples in the above discussion merely point out operable conditions and the trends to be expected from these variables.

The amount of carbon which can be deposited on the mica flakes to give nacreous gray-to-black flake pigments varies over a wide range. The weight of carbon can range from about 0.3–50%, based on total pigment weight, a range of about 1–15% being preferred. An even more preferred range is 2–6% of carbon based on total pigment weight. Carbon in amounts of only 0.3% gives useful products, though with amounts of carbon under about 1%, there is a tendency to a slight brownish tinge. As the amount of carbon is increased, there is a wholly unexpected maximum in darkness, or blackness, of the predominant appearance in products containing from about 1.5% to 3.5% carbon. With a further increase in carbon, there is a sharp drop in blackness which tapers off as the carbon content is increased to about 12–15% carbon, the general appearance being a light silver gray at this point. With a still further increase in carbon, this trend in appearance reverses again to give some increase in darkness with more carbon. Above about 19–20% carbon, a yellowish tinge develops, but the effect is to give a pleasing combination of gray-to-black with a golden sparkle up to as much as equal weights of carbon and mica (50% carbon). It should also be noted that such variables as the source of carbon and the temperatures used have an influence on the color of the pigment produced. For example, it has been pointed out that pyrolysis in the lower end of the usual temperature range tends to impart a brownish tinge to the pigment. However, if the conditions for preparation of the pigment are kept constant and only the carbon content is allowed to vary, the color will also vary in the manner just discussed.

The new nacreous, gray-to-black flake pigments of this invention have a combination of properties of special value in coating compositions not heretofore attainable in any single product nor in any combination of products. In the past, it has been a conventional practice to pigment a coating composition with a combination of aluminum powder and a colored pigment having a green or a blue or some other desired shade. The decorative effect obtained from such mixtures is frequently referred to as a "metallizing" effect, and it has been very desirable for many uses. However, as mentioned in the first of this specification, coating compositions containing aluminum tend to water-spot, and it has been an unsolved problem to obtain a metallized finish which is not susceptible to this phenomenon. When the new pigments of this invention are combined with colored pigments, such as phthalocyanine blue, in coating compositions, the resulting finish is not unlike the metallizing effect of aluminum as to color, but it is generally softer in tone. Such a finish has a pronounced sparkle with a flash of iridescent colors not seen in finishes containing aluminum flakes, and it is completely resistant to water-spotting. Moreover, whereas the addition of significant amounts of aluminum powder to a coating composition tends to degrade the lightfastness, the new pigments show no such tendency.

It has also been mentioned that aluminum powder has been combined with small amounts of carbon black to produce light gray, lustrous finishes generally excellent in properties except for the water-spotting. However, when attempts have been made to combine small amounts of aluminum with carbon black to give metallized black finishes, the resulting finishes have not been blacks but dull browns. In contrast, the proper selection within the range of the nacreous gray-to-black flake pigments of this invention has enabled the formulation of gray-to-black finishes with the desired metallized appearance together with an iridescent sparkle lacking in formulations based on aluminum powder.

Another completely unexpected advantage in the new flake pigments is their remarkable ease of dispersion in the usual vehicles of coating compositions. It is customary in dispersing pigments in vehicles to accomplish this dispersion by some form of grinding action. The mixture of pigment and vehicle may be passed through a roller mill several times; it may be ground in a ball mill; or it may be passed through a region of high shear, as in a homogenizer. A pigment which will disperse in a vehicle by simple agitation has been a desirable goal, but seldom attained in the prior art. The usual pigments containing carbon as well as untreated mica pigments have not shown this property heretofore. Now, however, it is found that the carbon-coated mica flake pigments of this invention are true "mix-in" pigments and can be completely dispersed by simple stirring. In fact, vigorous grinding procedures as in a ball mill for prolonged periods appear to destroy the flake-like characteristics to a major extent.

Finally, in addition to the freedom from water-spotting, the new flake pigments are resistant to all chemical reagents with which coating compositions are commonly contacted. They are, for instance, completely non-reactive with dilute acids and dilute alkalies and are generally insoluble in either aqueous or organic solvents. Moreover, finishes made from these new flake pigments have been substantially free from any change on exposure to light in accelerated testing methods on cellulose acetate films, as in Procedure B, as well as in outdoor exposure to sunlight and the elements of panels prepared as in Formulations A and B.

The new flake pigments of this invention find uses in all the conventional fields in which pigments are used. Outstanding automotive and other types of finishes with an unusual iridescent sparkle can be formulated in any of the vehicles commonly used, including alkyds and various modifications thereof, acrylic resins, nitrocellulose lacquers, oleoresinous varnishes, linseed oil, and the like. They enable the formulation of gray-to-black finishes of outstanding beauty and sparkle which have not previously been possible from commercially available pigments. The new pigments are readily dispersible in all compositions, usually without any work on the system other than that necessary to obtain uniform mixing. They are non-bleeding in all systems and exhibit excellent lightfastness. They may be used in admixture with other colors to obtain unusual toning effects and are especially valuable as dispersions in plastic compositions, either alone or in marbleized patterns. The following is a typical formulation which illustrates the use of the new pigment in an unsupported plastic film:

| | Parts |
|---|---|
| Pigment of this invention | 3 |
| Vinyl chloride polymer ("Pliovic" DB–80–Y) | 100 |
| Dioctyl phthalate | 40 |
| Polyester resin ("Paraplex" G–62) | 10 |
| Stabilizer (barium-cadmium-zinc phosphite) | 3 |
| Stearic acid | 0.25 |

The pigment is added to the mixture of ingredients and the whole mixture is processed until uniform on a two-roll mill, heated to 155° C. It is finally taken from the mill as a sheet of any desired thickness which may be observed as obtained or may be press polished in a suitable heated press. Films such as as the one obtained from this formulation exhibit the gray-to-black color effect of the pigment, and there is a brilliant sparkle with the effect of depth as the light is reflected from the particles at various depths within the sheet. However, iridescence is frequently less pronounced than in the enamel films.

In addition to all the uses previously discussed, the pigments of this invention may be used in other plastics, such as polyethylene and polypropylene, and in printing inks, linoleum, tile, rubber, and the like.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. Pigmentary compositions in the gray-to-black color range consisting essentially of a translucent micaceous flake substrate having on the surface thereof a translucent layer of carbon.

2. Pigmentary compositions in the gray-to-black color range consisting essentially of a translucent micaceous flake substrate having on the surface thereof a translucent layer of carbon, said carbon constituting about 0.3–50% by weight of the pigmentary compositions.

3. Pigmentary compositions in the gray-to-black color range consisting essentially of a translucent micaceous flake substrate having on the surface thereof a translucent layer of carbon, said carbon constituting about 1–15% by weight of the pigmentary compositions.

4. The pigmentary compositions according to claim 3 in which the carbon content is about 2–6% by weight of said compositions.

5. Pigmentary compositions in the gray-to-black color range consisting essentially of a translucent white mica flake substrate having on the surface thereof a translucent layer of carbon.

6. Pigmentary compositions in the gray-to-black color range consisting essentially of a translucent white mica flake substrate having on the surface thereof a translucent layer of carbon, said carbon constituting about 0.3–50% by weight of the pigmentary compositions.

7. Pigmentary compositions in the gray-to-black color range consisting essentially of a translucent white mica flake substrate having on the surface thereof a translucent layer of carbon constituting about 1–15% by weight of the pigmentary compositions, said pigmentary compositions exhibiting an iridescent sparkle in coating composition films.

8. Pigmentary compositions in the gray-to-black color range consisting essentially of a translucent white mica flake substrate having on the surface thereof a translucent layer of carbon, constituting about 2–6% by weight of the pigmentary compositions, said pigmentary compositions exhibiting an iridescent sparkle in coating composition films.

9. Pigmentary compositions in the gray-to-black color range consisting essentially of a mica extender pigment substrate having on the surface thereof a translucent layer of carbon constituting about 1–15% by weight of the pigmentary compositions, said pigmentary compositions exhibiting an iridescent sparkle in coating composition films.

10. Pigmentary compositions in the gray-to-black color range consisting essentially of a mica extender pigment substrate having on the surface thereof a translucent layer of carbon constituting about 2–6% by weight of the pigmentary compositions, said pigmentary compositions exhibiting an iridescent sparkle in coating composition films.

References Cited in the file of this patent

UNITED STATES PATENTS

| | | |
|---|---|---|
| 834,739 | Lillienfeld | Oct. 30, 1906 |
| 2,332,220 | Harshberger | Oct. 19, 1943 |
| 2,767,289 | Robinson | Oct. 16, 1956 |
| 2,875,076 | Suchow | Feb. 24, 1959 |
| 2,941,895 | Haslam | June 21, 1960 |
| 2,995,459 | Soloway | Aug. 8, 1961 |
| 3,008,844 | Grunin et al. | Nov. 14, 1961 |

FOREIGN PATENTS

| | | |
|---|---|---|
| 90,674 | Japan | Mar. 18, 1931 |